United States Patent [19]

Aslin

[11] 3,845,322

[45] Oct. 29, 1974

[54] PULSE GENERATOR

[75] Inventor: Harlan Keith Aslin, Livermore, Calif.

[73] Assignee: Physics International Company, San Leandro, Calif.

[22] Filed: July 3, 1972

[21] Appl. No.: 268,639

[52] U.S. Cl. .................................. 307/108, 307/110

[51] Int. Cl. ............................................ H02m 3/18

[58] Field of Search .............. 307/108, 110; 321/15; 320/1; 331/99, 185

[56] References Cited

UNITED STATES PATENTS

| | | | |
|---|---|---|---|
| 2,459,809 | 1/1949 | Gorham et al. | 307/108 |
| 2,470,118 | 5/1949 | Trevor, Jr. | 321/15 |
| 2,524,240 | 10/1950 | Titterton et al. | 307/108 |
| 3,501,646 | 3/1970 | Bishop | 307/110 |

*Primary Examiner*—David Smith, Jr.
*Attorney, Agent, or Firm*—Robert R. Tipton

[57] ABSTRACT

A Marx type electrical pulse generator is provided in which the individual capacitors which form the Marx stages are isolated by appropriately sized inductors. Beginning from zero current and voltage conditions, a source of direct current is connected to one end of the circuit and charges the inductors to the required energy levels in times of the order of milliseconds. A rapid acting switch connected to the other end of the circuit is caused to open when the inductors are charged, thus causing the energy stored in the inductors to be rapidly and nearly completely transferred to the Marx stage capacitors. Energy transfer time is of the order of hundreds of microseconds. The circuit extends capacitor life by minimizing capacitor electrification time. Additional inductances are provided to protect the source of direct current from transient currents and voltages normally produced by operation of the circuit.

21 Claims, 4 Drawing Figures

PATENTED OCT 29 1974 SHEET 1 OF 2 3,845,322

PULSE GENERATOR

BACKGROUND OF THE INVENTION

This invention relates to pulse generators and in particular to voltage multiplier pulse generators (Marx generators) delivering an electrical pulse of very short duration.

This type of pulse generator has found broad application in radiation effects simulator systems.

Two examples of such systems are: (1) prompt gamma ray simulators in which a source of pulsed high voltage is applied to a vacuum diode producing field emitted electrons which are subsequently accelerated into a high atomic number target material. X-rays produced as a result of Bremstrrahlung, simulate the degraded gamma-ray spectrum produced by nuclear devices and the radiation is used to assess the vulnerability of electronic and other systems exposed to such environments, and (2) electromagnetic pulse simulators in which a source of pulsed high voltage is applied to the terminals of a transmission line or antenna to produce an intense electromagnetic field that simulates a nuclear electromagnetic pulse. Again, electronics systems are exposed to the incident electromagnetic energy to access their vulnerability to such environments.

In some cases, especially with regard to electromagnetic pulse simulators, there is a need for portable, light weight source of pulsed high voltage. For systems using Marx type generators, a large fraction of the generator weight is associated with the energy storage capacitors which form the Marx generator stages. By developing and utilizing capacitors having high energy storage density, substantial reduction in weight and volume may be achieved.

To achieve such high energy density, it is necessary to rapidly charge and discharge the capacitor in order to otain and control the total electrification time.

In addition to the previous considerations, the output of two or more pulse generators either series or parallel connected may be employed to drive a load impedance in such a way that synchronous operation or operation with specific time phasing is required.

SUMMARY OF THE INVENTION

The circuit of the present invention achieves a rapid charging and discharging of its capacitors and permits the use of several of such circuits in series or parallel by utilizing a rapid opening circuit device which interrupts the flow of current to create a cancellation traveling wave through a network of a plurality of series connected inductances and parallel connected capacitors, which capacitors are discharged in series to obtain a high voltage pulse.

It is, therefore, an object of the present invention to provide a pulse generator circuit which is fast charging.

It is another object of the present invention to provide a pulse generator circuit which achieves a high energy density in its storage capacitors.

It is a further object of the present invention to provide a pulse generator circuit in which the total electrification time of the storage capacitors can be controlled.

It is still another object of the present invention to provide a pulse generator in which the generation of the pulse can be accurately timed.

It is yet a further object of the present invention to provide a pulse generator in which the interruption in the flow of current initiates the pulse generating sequence.

It is a futher object of the present invention to provide a pulse generator in which the energy losses are low.

These and other objects of the present invention will be manifest upon study of the following detailed description when taken together with the drawing.

DESCRIPTION OF THE PREFERRED EMBODIMENT

Figure 1:
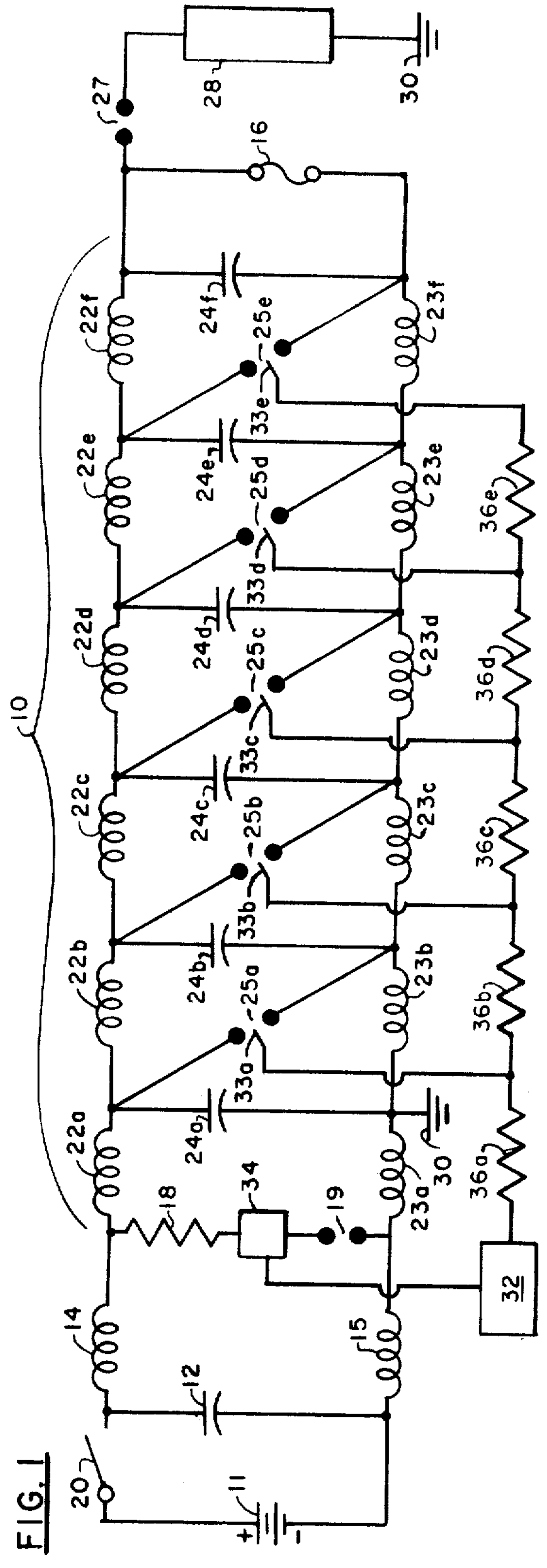
FIG. 1 is a schematic circuit diagram of a typical pulse generator of the present invention.

With reference to FIG. 1, the pulse generator circuit of the present invention comprises, basically, a Marx type generator network 10, a direct current power supply 11 shunted by a protective capacitor 12 and connected through protective inductances 14 and 15 to one side (power supply side) of generator network 10, a fast opening switch or similar device 16 connected across the other side (switch side) of generator network 10, and a fault protection terminating resistor 18 connected in series with a spark gap 19.

A switch 20 is provided to control the flow of current from D.C. supply 11 to the circuit.

D.C. power supply 11 is used to apply an initial voltage to network 10 to cause a D.C. current to flow through network 10 and switch 16. Power supply 11 is thus primarily a source of voltage for charging network 10 with a current as will be described in greater detail below.

Fast opening switch 16 is illustrated as a fuse in the present embodiment such that when its current capacity is exceeded, its conducting element or fuse link will rapidly melt, or vaporize, depending upon the magnitude of the current, and thus rapidly interrupt the flow of current through the circuit.

Other types of current interrupting devices could be used such as explosive actuated devices in which a high brisance explosive is detonated to destroy the electrical connection.

For repeated pulsing, an electron beam switch can be employed which uses the flow of electrons to ionize a gas which acts as the conductor. Stopping the flow of electrons in the beam acts to interrupt the current flowing through the switch.

In detail, generator network 10 comprises a first plurality of inductances 22a through 22f connected in series having one end, at inductance 22a, connected to one side of D.C. power supply 11 through protective inductance 14 and switch 20 and having its other end, at inductance 22f connected to one side of fast opening switch 16.

Generator network 10 further comprises a second plurality of inductances 23a through 23f connected in series having one end, at inductance 23a, connected to the other side of D.C. power supply 11 through protective inductance 15 and having its other end at inductance 23f connected to the other side of fast opening switch 16.

In order to protect network 10 from current and voltage surges which might be reflected after the initial surge reaches inductors 22a and 23a, a surge protection resistor 18 in series with a spark gap 19 is connected across the power supply side of inductors 22a and 23a.

In addition, in order to detect when the initial surge reaches resistor 18 and spark gap 19, a current detector 34 is disposed in series with them.

In order to discharge capacitors 24a–24f in series, trigger pulse generator 32 is connected with its input side to current detector 34 and its output side to trigger electrodes 33a through 33e, which are associated with spark gaps 25a through 25e, respectively.

Trigger pulse generator 32 is a one-shot pulse generator having a voltage output sufficient to ionize the gases between electrodes 25a–25e in order to break down the resistance of the gaps and permit a current to flow and discharge capacitors 24a–24f in series through load 28.

Connected parallel between corresponding inductances 22a through 22f and 23a through 23f are capacitors 24a though 24f.

In operation, spark gaps 25a through 25e connect capacitors 24a through 24f in series, thus producing an output voltage nV(0) across a high impedance load 28 where n is the number of Marx generator capacitor stages and V(0) is the initial capacitor charge voltage. For the network 10, there is one less of the spark gaps than capacitors, and n is equal to 6.

Discharge of the output pulse occurs across spark gap 27 which is connected in series with load 28 and ground 30. Capacitor 24a is also connected to ground 30, thus completing the circuit with respect to load 28 and capacitors 24a through 24f.

In order to initiate the discharge of capacitors 24a through 24f across spark gaps 25a through 25e, the output side of trigger pulse generator 32 is connected through trigger electrode isolating resistors 36a–36e to trigger electrodes 33a through 33e at spark gaps 25a through 25e, respectively, so as to cause ionization of the gases between the gaps and break down the gap resistance when peak charge of capacitors 24a through 24f is reached. Isolating resistors 36a through 36e are sized to prevent shorting out of spark gaps 33a–33e through the triggering circuit network.

The input to trigger pulse generator 32 is connected to current flow detector 34 which is connected in network 10 to detect the flow of current through fault protection resistor 18 and spark gap 19 when the cancellation traveling wave reaches the power supply end of network 10.

To operate the circuit of FIG. 1, switch 20 is closed in order to connect D.C. power supply 11 to generator network 10.

Upon closing of switch 20, current will flow though protective inductance 14, through series connected inductances 22a through 22f, through fast opening device 16, through inductances 23f through 23a, and through protective inductance 15 back to D.C. power supply 11.

The charging time, T(c), that is, the time it takes for the current to rise and approach a steady state value will depend upon the value of the total inductance of the network in accordance with the following equation:

$$i(t) = V/R(1 - e^{-t(R/L)}) \qquad \text{Eq. 1}$$

where $i(t)$ = value of current in amperes at time $t$.

$V$ = power supply voltage.

$R$ = stray series resistance.

$L$ = the sum of the inductances formed by the series circuit composed of inductors 14, inductances 22a through 22f, and inductances 23a through 23f and inductor 15.

$e$ = constant 2.7183

The charging voltage, $V$, can be of the order of a few hundred to a few thousand volts.

The charging time for the circuit elements selected below can be the order of milliseconds.

After the desired level of current flow in the circuit is achieved, fast opening device 16 is caused to open thus interrupting the flow of current through the circuit.

The action of rapidly opening switching device 16 produces a current cancellation wave which traverses back down network 10 beginning with inductances 22f and 23f and ending at inductances 22a and 23a. The transit time for the wave can be of the order of a few hundred microseconds.

This circuit can be conceived of as a transmission line having an initial current I(0) which is reduced to zero at its output end. As the cancellation wave traverses down the line, complete energy transfer from the inductors to the capacitors occurs with a subsequent reduction of the initial current to zero and charge of the capacitors to V(0) volts.

When the current cancellation wave reaches the input end of generator network 10, in FIG. 1 at the connection of isolating inductors 14 and 15 to inductors 22a and 23a, respectively, the voltage will quickly rise to V(0). The function of the protective inductors 14 and 15, and protective shunt capacitor 12, is to transiently isolate the D.C. power supply from the voltage V(0) which exceeds power supply voltage, V, by a significant factor. The values of inductors 14 and 15, and capacitor 12, will depend upon the specific choice of circuit parameters.

The arrival of the current cancellation wave at the input side of network 10 is detected by means of a discharge device or spark gap 19 which is connected in series with resistance 18 between the input ends of inductors 22a and 23a. In the present instance, a spark gap 19 is adjusted to break down at a voltage just below V(0) volts. The resulting current flow through spark gap 19 and resistor 18 is detected by means which can comprise conventional devices well known in the art such as a current probe, Rogowski coil, current viewing resistor, or, as shown, current detector 34 connected in series with the spark gap 19 and resistor 18. The detected signal is utilized with the aid of auxiliary circuitry in the form of trigger pulse generator 32 to trigger the Marx generator spark gap switches 25a through 25*e* into conduction, thus erecting the Marx generator, that is, discharging all the capacitors **24*a* through 24*f* and place the circuit in a condition to begin generation of another pulse. The resulting high voltage produced at the output side of the last Marx generator capacitor 24*f* is sufficient to break down spark gap 27 and network 10 and thus produce a high voltage output pulse at the load 28.**

This output pulse, for the circuit elements chosen below, is less than 1 microsecond in duration which is short compared with the network wave transit time.

In practice, for Marx generator circuits which have been constructed in accordance with the circuit of FIG. 1, the Marx generator erection delays have been found to be as low as 100 to 200 nanoseconds with corresponding delay deviations as low as 2.0 nanoseconds (r.m.s.).

Resistor 18 is a protective circuit element. If Marx generator network 10 should fail to erect due to trigger circuit malfunction or due to any other cause, resistor 18 terminates the transmission line formed by the inductors **22*a* through 22*f*, inductors 23*a* through 23*f*, and capacitors 24*a* through 24*f***.

The most appropriate choice of resistance for resistor 18 is a value which matches the characteristic impedance of network 10. For the circuit of Equation 1, this value is given approximately by:

$$Z(O) = (2L/C)^{1/2}$$

Eq. 2 where $Z(O)$ = the characteristic impedance of the lumped constant line.

$L$ = the value of a typical inductor **22*a*–22*f* or 23*a*–23*f***.

$C$ = the value of a typical stage capacitor **24*a*–24*f***.

A resistor value equal to the characteristic impedance dissipates the energy stored in the network 10 in one double transit time of the network 10.

Figure 2:
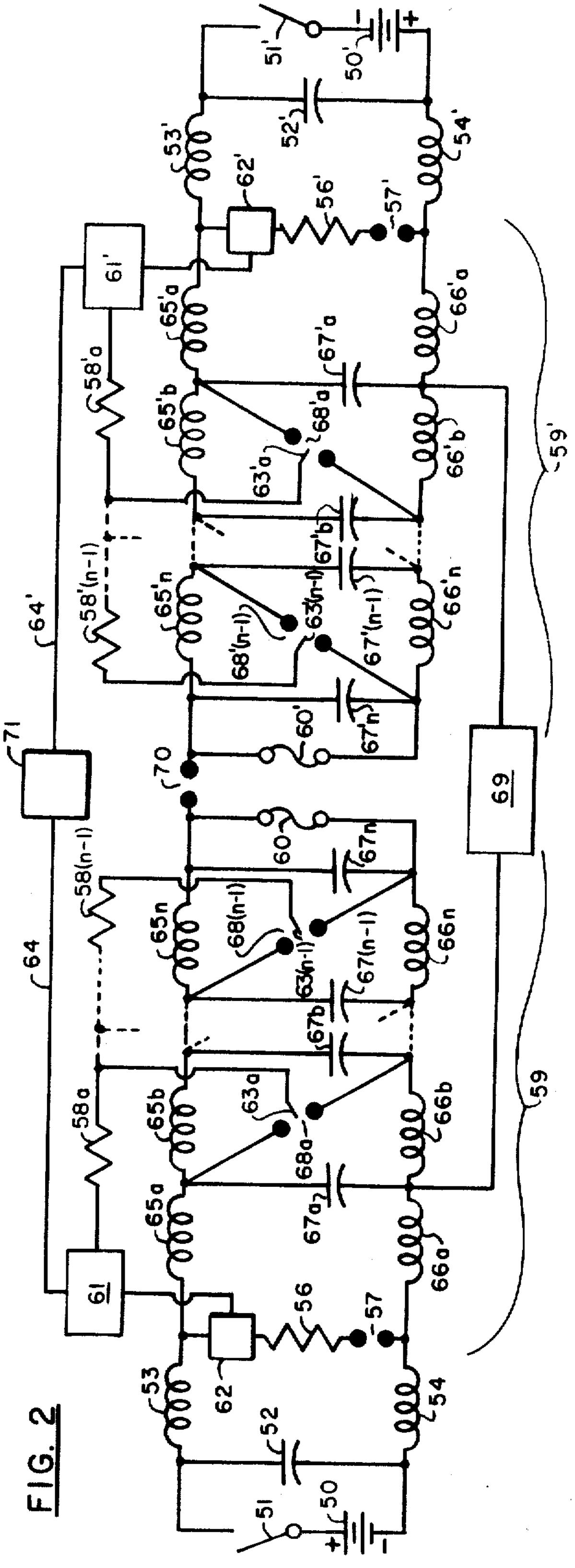
FIG. 2 is a schematic circuit diagram of a second embodiment of the typical pulse generator of the present invention arranged for doubling the voltage output but one which requires precision timing of the generators.

With reference to FIG. 2, two circuits of the type shown in FIG. 1 may be synchronized to double the output pulse voltage. It is important to note, however, that precision timing of the opening of switches 60 and 60' in FIG. 2 is not required since synchronous operation is achieved by triggering the Marx generators synchronously using trigger pulse generators 61 and 61'. Thus, some relative variation of cancellation wave arrival time at the input sides of the two networks can be tolerated. It is required, however, to couple the individual Marx trigger circuits so that the networks are synchronously triggered as described below.

For the particular pulse generator of FIG. 1, the number and value of inductors 22 and 23, capacitors 24 and charging voltage $V(O)$ are determined by the required output pulse and load 28 requirements.

Output voltage, $V$(out), of network 10 into a high resistance load is:

$$V(\text{out}) = nV(O)$$

Eq. 3 where $n$ = the number of Marx generator stages. $V(O)$ = capacitor charging voltage.

The energy stored in the Marx generator capacitors 24 following transfer from the inductors 22 and 23 is:

$$\text{Energy} = 1/2(C/n)(nV(O))^2$$

Eq. 4 where $C$ = the capacitance of each capacitor 24 in farads assuming all capacitors 24a-24f are equal.

$n$ = the number of Marx generator stages.

$V(O)$ = capacitor charging voltage.

The total energy initially stored in the inductors is given by:

$$\text{Energy} = 1/2(2nL)(I(O))^2$$

Eq. 5 where $L$ = the inductance of each of the inductors in henries assuming all inductors **22*a*–22*f* and 23*a*–23*f*** are equal.

$I(O)$ = the initial current through the inductors in amperes just prior to opening switch 16.

$n$ = the number of Marx generator stages.

Since the energy in the capacitors is equal to the inductors, the two equations are equal to each other as follows:

$$1/2(C/n)(nV(O))^2 = 1/2(2nL)(I(O))^2$$

Eq. 6 which reduces to:

$$CV(O)^2 = 2LI(O)^2$$

Eq. 7

The discharge time, $T(d)$, of the circuit of FIG. 1 into a resistive load $R(L)$ neglecting the effects of stray series circuit inductance is:

$$T(d) = R(L)(C/n)$$

Eq. 8

The charging time, T(c), of the capacitors must be long relative to the discharge time, T(d), therefore:

$$T(c) = kT(d)$$

Eq. 9 where $k$ = a constant much larger than 1.

The charge time, $T(c)$, for the network of capacitors and inductors is just one wave transit time of the network. From transmission line theory:

$$T(c) = n(2LC)^{1/2} = kT(d)$$

Eq. 10 which reduces to:

$$L = 1/2(k/n)^2T(d)^2/C$$

Eq. 11

By substituting Equation 11 into Equation 7, above, Equation 7 reduces to:

$$I(O) = nCV(O)/T(d)k$$

Eq. 12

Using FIG. 1 as an example, it is desired to produce a pulsed output voltage across load 28 of 600,000 volts. Equivalent series capacitance, $C/n$, of the system is $2nF$, which produces a pulse with a decay constant, $T(d)$, equal to 120 nanoseconds into the load resistance 28 of value 60 ohms.

From the circuit of FIG. 1, $n = 6$. Since $V(\text{out}) = nV(O)$, $$V(O) = V(\text{out})/n = 600{,}000/6 = 100{,}000 \text{ volts}$$

Substituting the above values of $V(O)$, $C$, $T(d)$ and $n$ into equations 11 and 12:

$$L = 1/2(k/n)^2T(d)^2/C = 1/2(k/6)^2(120 \times 10^{-9})^2/(12 \times 10^{-9})$$

$$L = 16.67 \times 10^{-9}\ k^2 \text{ henries}$$

$$I(O) = n(CV(O)/T(d)) = 6(12 \times 10^{-9})(100 \times 10^3)/(120 \times 10^{-9})(k)^{-1}$$

$$I(O) = 6 \times 10^4\ /(k) \text{ amperes}$$

For a charging time, $T(c)$, of 120 microseconds, the value of $k$ as determined from Equation 9 is $k = 1 \times 10^3$.

The value of inductance, in henries, is therefore:

$$L = 16.67 \times 10^{-9}k^2 = 16.67 \times 10^{-9}(1 \times 10^6)$$

$$L = 16.67 \times 10^{-3} \text{ henries}$$

The value of initial current $I(O)$ is:

$$I(O) = 6 \times 10^4/k = 6 \times 10^4/1 \times 10^3 = 60 \text{ amperes}$$

Figure 3:
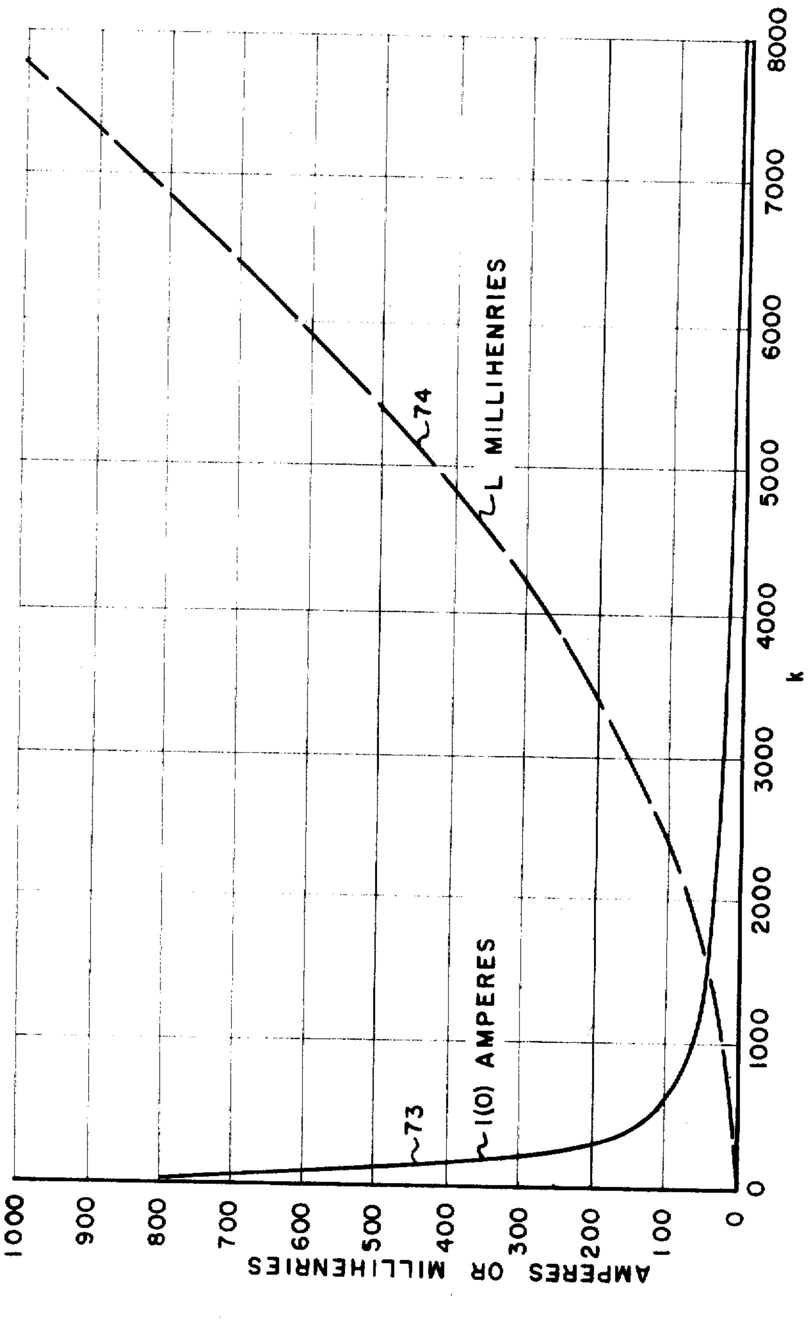
FIG. 3 is a graph of circuit characteristics for a particular circuit.

A graph of inductor size for each individual inductor 22*a* through 22*f* and 23*a* through 23*f* as a function of $k$, and the value of charging current $I(O)$ as a function of $k$ for the above example is shown in FIG. 3.

Curve 74 represents the value of $L$ in millihenries as a function of $k$. Curve 73 represents the value of current $I(O)$ in amperes as a function of $k$.

With respect to protective inductances 14 and 15, and protective capacitor 12, the value of these components must be such to effectively isolate the power source from the Marx generator capacitor charging voltage. The impedance of the transmission line formed by inductors 22 and 23 and capacitor 24 given in Equation 2 is:

$$Z(O) = (2L/C)^{1/2} = {}^{\prime}2(16.67 \times 10^{-3})/12 \times 10^{-9})^{1/2} = 1{,}666 \text{ ohms}$$

Figure 4:
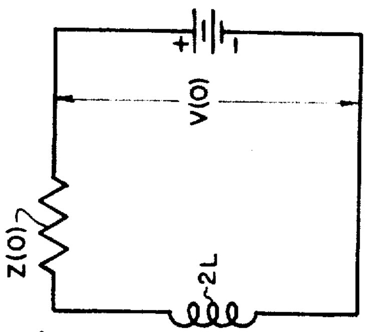
FIG. 4 is a simplified circuit diagram lumping all the circuit constants into one value.

Thus, if the value of the protective capacitor 12 is large, with respect to Marx stage capacity, the power supply protective circuit represented as a simplified schematic circuit diagram with all constants lumped into one value, as shown in FIG. 4, where $V(O)$ is the propagating wave voltage associated with the charging of the Marx capacitors, $Z(O)$ is the transmission line impedance and 2L is the series combination of the two isolating inductors, assuming that their values are equal.

For the particular values chosen for the circuit of FIG. 1, stage-to-stage wave transit time is approximately 20 microseconds and it is therefore required to size the protective inductors such that the circuit of FIG. 4 is essentially an open circuit for this time duration.

Thus, $$2L/Z(O) \text{ is greater than 20 microseconds}$$

which implies $$L \text{ is greater than } 20(Z(O))/2 \text{ microhenries}$$

For $Z(O) = 2\ K$ ohms $$L \text{ is greater than 20 millihenries}$$

Therefore, an appropriate choice of the value of $L$ for the particular example might be $L = 40$ millihenries or about twice the value of the typical network inductances 22 and 23.

The value of the protective terminating resistance 18 is matched to the impedance of the network 10, i.e., about 1,666 ohms for the particular example of FIG. 1.

With respect to FIG. 2, there is shown a second embodiment of the pulse generator circuit of the present invention in which two circuits are used to double the voltage across a load.

Each circuit comprises a D.C. power supply 50 and 50', switches 51 and 51', protective inductances 53, 53' and 54 and 54', protective capacitors 52, 52' terminating resistors 56 and 56' with spark gaps 57 and 57' connected to networks 59 and 59', respectively. Fast opening switches 60 and 60' are connected across the output ends of circuit 59 and 59', respectively. The two circuits 59 and 59' are series connected to load 69 by way of an output switch or spark gap 70.

Circuits 59 and 59' are identical in all respects so that a detailed description of one will serve to describe the other.

Circuit 59 comprises a first plurality of series connected inductors 65*a* through 65*n*. Inductor 65*n* represents the nth inductor in the series in which $n$ can represent any number.

Circuit 59 further comprises a second plurality of series connected inductors 66*a* through 66*n* equal in number to the inductors of said first plurality of inductors.

A plurality of capacitors 67*a* through 67*n* are connected in parallel between corresponding inductors 65*a*–65*n* and 66*a*–66*n*.

Capacitors 67*a* through 67*n* are also connected in series by spark gaps 68*a* through 68($n$-1). The number of spark gaps is one less than the number of capacitors.

The output side of capacitor 67*n* is connected to one side of spark gap 70 while the output side of capacitor 67'*n* is connected to the other side of spark gap 70.

It will be noted that one side of capacitor 67*a* and 67'*a* is connected to load 69. It will also be noted that the polarities of power supplies 50 and 50' are opposite one another. Thus, the output pulse voltage across load 69 is twice that of each circuit considered separately.

To synchronize the operation of the two Marx generator networks 59 and 59' so that they both discharge their energy through load 69 at the same time, trigger pulse generators 61 and 61' are used in conjunction with synchronizing means 71.

The input side of trigger pulse generator 61 is connected to current detector 62 which is connected in series with protective resistor 56 and spark gap 57. The output side of trigger pulse generator 61 is connected to trigger electrodes 63*a* through 63($n$—1) at gaps 68*a* through 68($n-1$), respectively. Trigger pulse generator 61' is similarly connected to network 59'.

Trigger electrodes 63$a$ through 63($n-1$) are resistively isolated from each other by isolating resistors 58$a$ through 58($n-1$), as in the case of FIG. 1, to prevent shorting out of the spark gaps through the triggering circuit network.

A communication link 64 and 64' connects trigger pulse generators 61 and 61' to synchronizing means 71 in order to communicate the current detecting signals from current detectors 62 and 62' through pulse generators 61 and 61' to synchronizing means 71 and also communicate the synchronizing signal from synchronizing means 71 to trigger pulse generators 61 and 61', respectively.

The synchronizing signal from means 71 causes trigger pulse generators 61 and 61' to generate synchronized trigger pulses to break down gap resistance of gaps 68$a$ through 68($n-1$) and 68'$a$ through 68'($n-1$) to discharge capacitors 67$a$–67$n$ and 67'$a$–67'$n$ and thus erect Marx generator networks 59 and 59'.

Communication links 64 and 64' can be any type of conductor for transmitting electrical information, however, for the extra high voltages encountered in the apparatus of the present invention, links 64 and 64' comprise an optical link such as a light pipe or fiber optics line so that trigger pulse generators 61 and 61' and synchronizing means 71 are electrically insulated from each other.

To operate the circuit of the present invention shown in FIG. 2, fast opening switches 60 and 60' are opened with fair synchronism to cause a cancellation traveling wave to begin their transits down networks 59 and 59' toward protective capacitors 52 and 52', respectively.

When the cancellation wave reaches the series connected current detectors 62 and 62', protective resistors 56 and 56', and spark gaps 57 and 57', a current will begin to flow through these elements which will be detected by current detectors 62 and 62', which information is communicated to synchronizing means 71 through links 64 and 64'.

At the point in time when optimum energy can be obtained, synchronizing means 71 generates a signal through links 64 and 64' to cause trigger pulse generators 61 and 61' to fire to cause networks 59 and 59' to discharge simultaneously through gap 70 and load 69.

Thus a high voltage pulse is caused to discharge through a load which can be repeated at regular intervals as desired.

Where it may be desired to add a high frequency component to the output pulse by forming the leading edge of the pulse into a very fast rising wave, a peaking capacitor (not shown) may be added to the circuit.

The value of the peaking capacitor may be very small (several nanofarads) when compared with capacitors 24a-24f of FIG. 1 or 67$a$–67$n$ and 67'$a$–67'$n$ of FIG. 2.

The peaking capacitor functions to provide to the load an early appearing current immediately followed by the main Marx generator supplied current.

In FIG. 1, the peaking capacitor would be connected across or in parallel with series-connected load 28 and spark gap 27 (between ground 30 and the point of connection of switch 16 with spark gap 27).

In FIG. 2, two peaking capacitors would be used. One peaking capacitor would be connected between the side of load 69 connected to Marx generator network 59 and the point of connection of switch 60 to spark gap 70. The other peaking capacitor would be connected between the side of load 69 connected to Marx generator network 59' and the point of connection of switch 60' to spark gap 70.

I claim:

1. A pulse generator comprising
- a Marx generator network comprising a plurality of series and parallel connected inductances and capacitances having a power supply end and a switch end,
- a supply of voltage and current connected to said power supply end,
- means for initiating a cancellation traveling wave through said network beginning at said switch end and ending at said power supply end to charge said capacitors, and
- means for discharging said capacitors through a load.

2. The pulse generator as claimed in claim 1 further comprising,
- means for preventing said cancellation traveling wave from reaching said supply of voltage and current.

3. The pulse generator as claimed in claim 2 wherein said means for preventing said cancellation traveling wave from reaching said supply of voltage and current comprises,
- a capacitor connected in parallel across said supply of voltage and current,
- a pair of inductances connected in series to said capacitor and said supply of voltage and current, and
- means for discharging said cancellation traveling wave current connected across said pair of inductances and said power supply end of said Marx generator.

4. The pulse generator as claimed in claim 1 wherein said means for discharging said capacitors through a load comprises,
- means for detecting when said cancellation traveling wave has reached said power supply end of said network,
- means connected to said means for detecting said cancellation traveling wave, for connecting and discharging said capacitors in series through said load when said cancellation wave reaches said power supply end of said network.

5. The pulse generator as claimed in claim 4 wherein said means for connecting and discharging said capacitors in series comprises,
- a plurality of spark gaps connecting said capacitors in series,
- a plurality of triggering electrodes associated with said gaps, and
- means for generating an electrical potential on said triggering electrodes for breaking down the electrical resistance of said gaps.

6. The pulse generator as claimed in claim 1 further comprising
- means for releasing the energy in said Marx generator network upon failure of said capacitors to discharge through said load.

7. The pulse generator as claimed in claim 6 wherein said means for releasing energy in said Marx generator comprises a resistor, a spark gap connected in series with said resistor, and said series connected resistor and spark gap connected across said power supply end of said Marx generator network.

8. The pulse generator as claimed in claim 7 further comprising means for detecting current flowing through said series connected resistor and spark gap, and means connected to said means for detecting current, for connecting and discharging said capacitors in series through said load upon detection of a current flowing through said resistor and spark gap.

9. The pulse generator as claimed in claim 8 wherein said means for connecting and discharging said capacitors in series comprises a plurality of spark gaps connecting said capacitors in series, and means for causing said spark gaps to conduct.

10. The pulse generator as claimed in claim 9 wherein said means for causing said spark gaps to conduct comprises a plurality of triggering electrodes associated with each of said spark gaps, and means for generating an electrical potential on said electrodes for breaking down the electrical resistance of said gaps.

11. A pulse generator comprising, a direct current power supply, means for rapidly interrupting the flow of electrical current, a first plurality of inductances connected in series having one end connected to one side of said direct current and voltage power supply, and its other end connected to one side of said means for rapidly interrupting an electrical current, a second plurality of inductances equal in number to said first plurality of inductances connected in series having one end connected to the other side of said direct current power supply and its other end connected to the other side of said means for interrupting an electrical current, a plurality of capacitors connected in parallel between said first and second plurality of inductances, each of said capacitors connecting corresponding inductances in said first plurality of inductances with said second plurality of inductances, and means for connecting and discharging said capacitors in series through a load.

12. The pulse generator as claimed in claim 11 further comprising means for limiting the flow of surge current back to said direct current and voltage power supply.

13. The pulse generator as claimed in claim 12 wherein said means for limiting the flow of surge current back to said direct current and voltage power supply comprises, an inductance connected between said direct current and voltage power supply and said first and second plurality of inductances, and a capacitor connected across said direct current and voltage power supply.

14. The pulse generator as claimed in claim 11 further comprising means for causing the energy of a traveling wave traversing down said plurality of inductances and capacitances toward said direct current and voltage power supply to be dissipated in the event said first and second plurality of inductances and plurality of capacitances fails to erect.

15. The pulse generator as claimed in claim 11 further comprising means connected across said means for interrupting an electrical current for causing said electrical discharge from said plurality of capacitors to peak.

16. A pulse generator comprising, a Marx generator network, a direct current power supply connected to one side of said Marx generator network, and means for interrupting an electrical current connecting the two legs of said Marx generator network at the side of said network opposite the side connected to said direct current and voltage power supply.

17. The pulse generator as claimed in claim 16 further comprising means for limiting the flow of surge current back from said Marx generator to said direct current power supply.

18. The pulse generator as claimed in claim 17 wherein said means for limiting the flow of surge current back to said direct current power supply comprises an inductance connected between said power supply and said Marx generator, and a capacitor connected across said power supply.

19. The pulse generator as claimed in claim 18 further comprising, means for causing the energy of a traveling wave traversing down said Marx generator network toward said direct current power supply to be dissipated in the event said Marx generator network fails to erect.

20. The pulse generator as claimed in claim 19 wherein said means for causing the energy of said cancellation traveling wave to be dissipated comprises, a resistor, a spark gap connected in series with said resistance, said series connected resistance and spark gap connected across the side of said Marx generator that is connected to said power supply.

21. The pulse generator as claimed in claim 16 further comprising means connected across said load for causing said electrical discharge from said Marx generator to have a fast rise time.

* * * * *